Patented Mar. 14, 1950

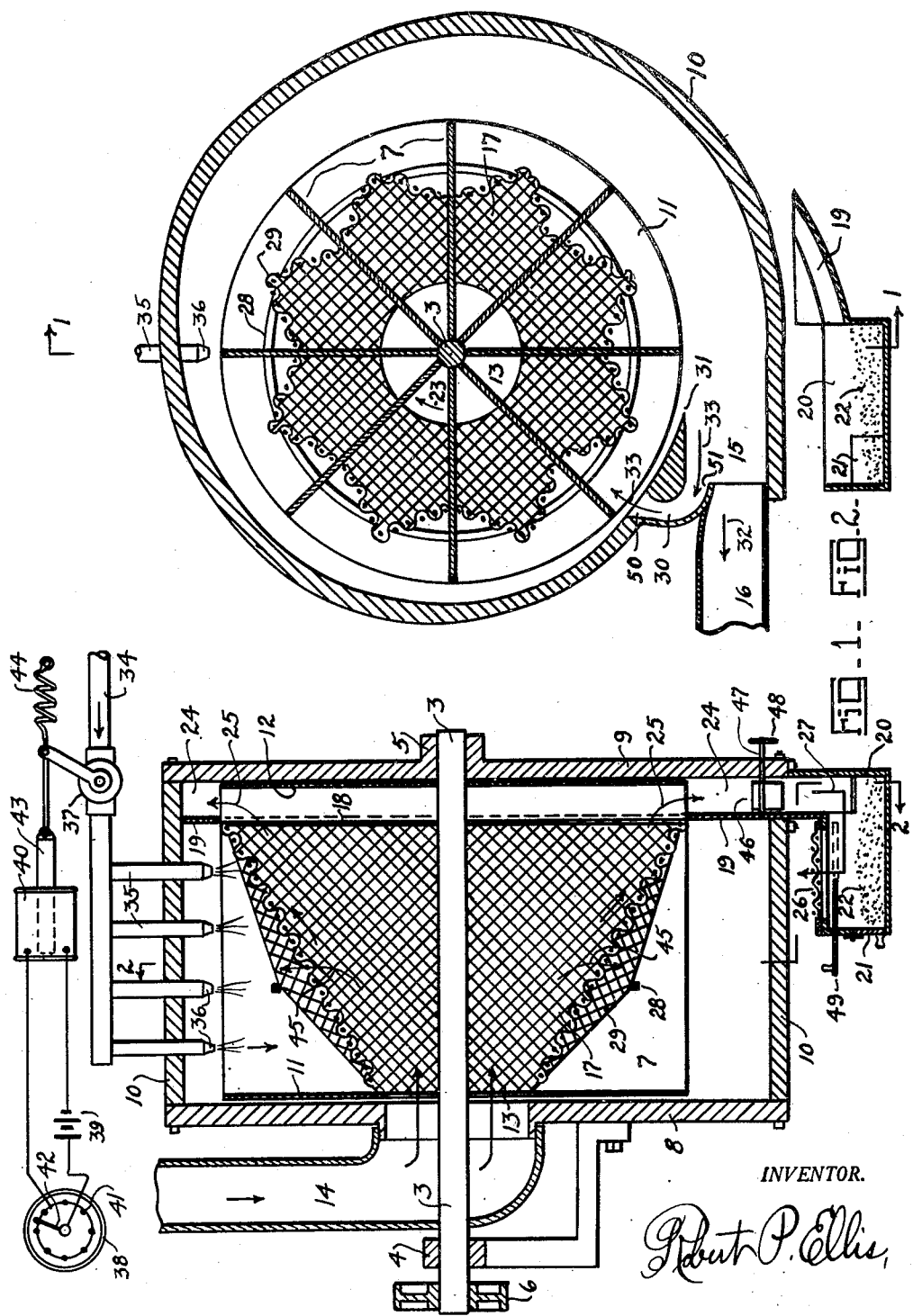

2,500,747

UNITED STATES PATENT OFFICE 2,500,747

DUST SEPARATING AND COLLECTING MACHINE

Robert P. Ellis, New York, N. Y.

Application January 5, 1946, Serial No. 639,249

10 Claims. (Cl. 183—57)

This invention relates to dust separators and the principal object of the invention is the provision of an apparatus, complete in machine form, which will effectively and efficiently separate the dust from dust laden air or gases.

Another object of the invention is the provision of a dust separating machine which will effectively separate the dust particles from dust air and cause the purified air to be delivered through one outlet of the machine and the separated dust at another outlet.

A still further object of the invention is the provision of a machine of the above described character which will incidentally act as a suction fan and pull the dust laden air to and through it and also create pressure to the purified air leaving the machine.

And a still further object of the invention is the provision of a dust separating machine in which the separating sieves are periodically or continuously cleaned during the dust separating process so that it is impossible to clog the sieves, incidentally causing the sieves to operate at maximum efficiency at all times.

Other and further objects will appear in the specifications and be specifically pointed out in the appended claims, reference being had to the accompanying drawings exemplifying the invention, and in which:

Fig. 1 is a longitudinal section of the machine taken on the line 1—1 of Fig. 2.

Fig. 2 is a cross section on line 2—2 of Fig. 1.

As now used, dust separating apparatus consist of a centrifugal suction fan, which draws the dust laden air from any desired space or enclosure, and delivers it to a large capacity chamber in which are mounted cloth sifting means of large area which prevent the dust from passing through and thereby causing the separated dust to be deposited on the inner side of the cloth sifter. This cloth is periodically shaken so that the dust is dislodged from adherence to the inner side of the cloth and the dust thereby falls to the bottom of the chamber from where it can be conveniently collected from time to time. The fault of such system is that it requires considerable space, is inexpensive in first cost and its necessarily remote location causes some inconvenience in the accumulated dust collection. My machine overcomes all these drawbacks and disadvantages in that the dust separating means is contained directly within the centrifugal fan, which may be placed at any convenient location to the source of dust laden air or gas, no separate sifting chamber being necessary, thus also eliminating much air duct. My machine is also applicable to small installations such as with the familiar portable household vacuum cleaner, the customary filter bag being now dispensed with, a small dust collecting box being used instead.

Referring now to the drawings in which like characters and numerals of reference refer to similar parts throughout the several views, the numeral 3 denotes a shaft which revolves in bearings 4 and 5 respectively, a pulley 6 being attached to one end of the shaft through which rotative power is applied. Intermediate the bearings 4 and 5 are attached to the shafts, as by welding, a number of radially extending blades or vanes 7, which are enclosed by the side walls 8 and 9 respectively and the involute outer casing 10, as in the conventional centrifugal fan. Circular side plates 11 and 12 are also provided to which the blades 7 may be attached on either end in the conventional manner, the plate 11 having the usual centrally disposed hole 13 through which the dust laden air enters the fan casing from the duct 14. As so far described, no invention is claimed, the construction being similar to the conventional centrifugal fan or blower. The wide part of the volute 10 also terminates in the outlet 15 in the usual manner where the duct 16 carries the compressed air to any desired destination.

However, in my design, I provide a conical frustrum shaped filtering means 17, extending from its small diameter, which is approximately equal in diameter to that of the hole 13, to its base which terminates in ring 18, this ring being preferably located a short distance from circular side plate 12 as illustrated, and being attached to the vanes 7, the purpose being to hold the base of the conical frustrum filter means 17 securely in place. The dust filter means 17 may consist of any filtering sheet material suitable to the quality of the dust to be separated from the gas, such as canvas, silk or even fine metal wire or gauze, the latter being distinctly preferable for separating soot from hot chimney gases. A stationary ring 19, of involute outer form and attached to the volute casing 10 as by welding, is disposed in close proximity to rotating ring 18 so that little or no air can pass between them. The lower portion of the ring 19 extends into the dust collecting receptacle 20, located preferably beneath the blower outlet 15 as illustrated, a door 21 permitting convenient access for the removal of the dust 22.

The operation of my dust separating machine is now as follows; as the shaft 3 rotates in the direction of arrow 23, the air within the fan casing is thrown outward by centrifugal force as is well understood and forced out of the casing through outlet 15, incidentally sucking in additional air through inlet 13, which air is presumed to be dust laden. This impure air, before it can reach outlet 15, must necessarily pass through filtering screen 17. The air readily passes through this screen as indicated by arrows 45 but the dust particles are too large to pass through the interstices of the screen material and would ordinarily remain stationary on the inner surface of the screen and quickly clog it, thus also preventing further air from passing through and rendering the machine useless. However, by inclining the screen 17 radially outward from the air entrance 13, the dust particles on the inner surface of the screen are forced outwardly by centrifugal force and axially towards the hole of ring 19 which thus effectively prevents the now separated dust particles from again intermingling with the air flowing around the volute fan casing 10 and out through outlet 15. The dust particles, together with some air, are thus forced into end compartment 24 as indicated by arrows 25, (see Fig. 1). Compartment 24 leads to the dust box 20, the comparatively small amount of air, which acts as a vehicle for the now concentrated dust in end compartment 24, escaping through stationary filter 26 on top of box 20 as indicated by arrow 27, the dust 22 reposing at the bottom of the box. This procedure keeps up indefinitely or as long as the fan rotates. In order to provide additional surface area for the filtering screen 17, I provide a ring 28, which passes through vanes 7 and is secured thereby, and to which ring between each pair of vanes, is secured an upstanding fold 29 of screen 17, this retaining the necessary radially outward inclination of the screen. It will thus be apparent that the dust is quickly concentrated into end compartment 24 and deposited into box 20 from which it is easily removed or led to a larger dust bin by gravity.

In order to prevent the dust filtering screen 17 from eventually becoming clogged with fine dust particles and reducing the efficiency of the blower, I provide automatic means for continually forcing air from the outside of the screen 17, at substantially right angles thereto, so that any dust particles adhering to the inside surface of the screen will be forcibly dislodged as will be easily understood. This is accomplished by the air deflecting passage 30 (see Fig. 2), which is preferably located immediately behind the cut-off 31. It will thus be apparent that, while most of the air being forced around the inner side of the volute casing 10 passes through outlet 15 as indicated by arrow 32, a sufficient portion thereof is forced in the direction of arrows 33 directly against the outer surface of the rotating screen 17 thereby dislodging the fine dust particles attempting to adhere to the inner surface of the screen 17 and between the interstices thereof, these dust particles being incidentally edged onward further and further towards end compartment 24 by centrifugal force into dust collecting box 20, incidentally enabling a minimum area of screen 17 to be employed and also providing a clean screen of maximum efficiency at all times during its operation. The passage 30 is provided with an expanding nozzle 50 and an enlarged ram effect entrance 51.

Should the dust be sticky or of such nature that an especially strong current of air would be required to dislodge the dust particles from the inner surface of the screen 17, I provide a compressed air manifold 34 to which a sufficient number of nipples 35, having nozzles 36, are attached and which extend into the fan housing as shown. By periodically opening valve 37, a very strong blast of air is impinged against the outer surface of screen 17, thus effectively forcing off the clogging dust particles from the inside surface thereof. A time switch 38 may be provided which closes an electric circuit from the battery 39 through solenoid 40 when the movable contact arm 42 temporarily contacts the upstanding stationary contacts 41, the solenoid 40 then pulling in the plunger 43 against tension of spring 44 and opening valve 37 until such time as the contact arm 42 passes over the particular contact 41 and opens the electric circuit, when the spring 44 pulls solenoid 43 back and closes valve 37. The arm 42 may preferably be rotated by clock-work mechanism, not shown, and additional contacts 41 may be connected into the circuit if desired so that a lesser time period of cleaning the screen 17 results. It will thus be apparent that this dust separating machine will operate at high efficiency continuously, being self cleaning. It is also evident that a large number of variations are possible, depending largely on the physical quality of the dust particles, the size of the particles, the temperature of the gases, whether or not the separator will be used in a stationary or portable device, etc., and I do not wish to limit myself to the particular design herein illustrated. The volume of the air flow from compartment 24 into screened box 20 may be regulated by means of the damper 46 to which is attached the revolvable rod 47 which passes through side wall 9 of the casing and partition 19 and terminates in control hand wheel 48. If this damper is almost shut, very little air will flow into box 20 but the now greater concentrated dust will be impelled by centrifugal force through the small openings left on either side of damper 46. If the dust is of such quality that greater air velocity is required to force it into box 20, the damper 46 is opened further. Another damper or slide 49 may be used to control the quantity of air flowing through screen 26 with somewhat similar results, this damper 49 being slidable underneath screen 26 so as to vary the area of outlet to said screen from box 20.

From the foregoing description, it will be apparent that I have evolved a dust separating and collecting machine combined with a fan blower, thus greatly simplifying the method of separating dust from gases as heretofore used. Incidentally, I provide a simple method of keeping the screening means clean continuously and free from becoming clogged with dust particles by using the force of a portion of the air being circulated around the volute casing by the fan itself and increasing its velocity by ram and nozzle effect. And finally I provide a dust separating and collecting machine in exceedingly compact and inexpensive form, entirely eliminating the heretofore large and costly dust filtering compartments connected to the fan-blower outlet by ducts.

Various changes may be made in the embodiment of the invention hereinabove specifically described without departing from or sacrificing the advantages of the invention as defined in the appended claims.

I claim:

1. A dust separating and collecting machine comprising a conventional type centrifugal fan having a volute casing with axially disposed inlet and tangentially disposed outlet with rotatable fan blades mounted therein, a partition concentrically disposed around the periphery of said fan blades at the opposite end from said fan inlet and defining a separate small dust collecting compartment, and a conical frustum shaped screen concentrically disposed between said fan blades and leading from the said fan inlet to said separate dust collecting compartment.

2. A dust separating and collecting machine as in claim 1, said conical frustum shaped screen defining a closed passage from said fan inlet to said separate dust collecting compartment.

3. A dust separating and collecting machine comprising a conventional type centrifugal fan having a volute casing with axially disposed inlet and tangentially disposed outlet with rotatable fan blades mounted therein, a partition concentrically disposed around the periphery of said fan blades at the opposite end from said fan inlet and defining a separate small dust collecting compartment, and a conical frustum shaped screen concentrically disposed in relation to said fan blades and leading from said fan inlet to said separate dust collecting compartment, said conical frustum shaped screen flaring outwardly from said fan inlet to said dust collecting compartment.

4. A dust separating and collecting machine comprising a conventional type centrifugal fan having a volute casing with axially disposed inlet and tangentially disposed outlet with rotatable fan blades mounted therein, a partition concentrically disposed around the periphery of said fan blades at the opposite end from said inlet and defining a separate dust collecting compartment, a conical frustrum shaped screen concentrically disposed between said fan blades and leading from said inlet to said separate dust collecting compartment, and a by-pass in the casing of said centrifugal fan, said by-pass extending from the outlet in said centrifugal fan to a point slightly further around the circumference thereof in the direction of rotation.

5. A dust separating and collecting machine as in claim 4, the outlet of said by-pass being directed approximately at right angles to the surface of said screen.

6. A dust separating and collecting machine comprising a conventional type centrifugal fan having a volute casing with axially disposed inlet and tangentially disposed outlet, a dust collecting compartment disposed opposite from said inlet, a dust separating screen extending from said inlet to said dust collecting compartment, a series of compressed air outlets, said air outlets extending inwardly through said fan casing from the outside thereof to close proximity of said dust separating screen, a source of compressed air, and means for delivering said compressed air through said air outlets onto the outer side of said dust separating screen.

7. A dust separating and collecting machine as in claim 6, said means comprising a valve, a magnetic solenoid, an electric time switch, an electric circuit, and a source of electric energy, said time switch periodically closing said electric circuit through said solenoid and opening said valve periodically.

8. A dust separating and collecting machine comprising a conventional centrifugal fan having a volute casing, an axially disposed air inlet and tangentially disposed air outlet in said casing, a dust collecting compartment within the fan casing, said dust collecting compartment being disposed opposite said air inlet, a fan rotor, a dust separating screen, said screen being of hollow conical frustum shape and attached to said fan rotor and having its vertex adjacent to said air inlet and its base adjacent to said dust collecting compartment, a dust collecting box, a passage between said dust collecting compartment and said dust collecting box, said dust collecting box being provided with a screen impervious to the passage of dust particles but permitting the passage of air.

9. A dust separating and collecting machine as in claim 8 and a regulating damper, said damper being interposed in said passage between aforesaid dust collecting compartment and said dust collecting box.

10. A dust separating and collecting machine comprising a volute casing, a bladed rotor revolvable within said casing, means for revolving said rotor, an axially disposed air inlet and a tangentially disposed air outlet in said casing, a dust collecting compartment within said casing disposed opposite said air inlet, a dust separating screen, said screen being of hollow conical frustum shape and attached to the fan rotor and having its vertex adjacent the said air inlet and its base adjacent the said dust collecting compartment, a dust collecting box, said dust collecting box being separate from said dust collecting compartment, a duct leading from said dust collecting compartment to said dust collecting box, an adjustable damper in said duct, and an adjustable screened air outlet in said dust collecting box.

ROBERT P. ELLIS.

REFERENCES CITED

The following references are of record in the file of this patent:

UNITED STATES PATENTS

| Number | Name | Date |
| --- | --- | --- |
| 519,026 | Ringheim | May 1, 1894 |
| 1,420,665 | Newcombe | June 27, 1922 |
| 1,498,061 | Adams | June 17, 1924 |
| 1,580,291 | Dollinger | Apr. 13, 1926 |
| 2,244,165 | MacFarland et al. | June 3, 1941 |

FOREIGN PATENTS

| Number | Country | Date |
| --- | --- | --- |
| 353,874 | Germany | Feb. 8, 1920 |
| 620,499 | Germany | Oct. 3, 1935 |